(12) United States Patent
Wang

(10) Patent No.: US 9,296,256 B2
(45) Date of Patent: Mar. 29, 2016

(54) FITTING STRUCTURE OF WHEEL COVER

(71) Applicant: Po-Kang Wang, Tainan (TW)

(72) Inventor: Po-Kang Wang, Tainan (TW)

( * ) Notice: Subject to any disclaimer, the term of this patent is extended or adjusted under 35 U.S.C. 154(b) by 272 days.

(21) Appl. No.: 14/057,279

(22) Filed: Oct. 18, 2013

(65) Prior Publication Data

US 2015/0108825 A1 Apr. 23, 2015

(51) Int. Cl.
*B60B 7/12* (2006.01)
*B60B 7/08* (2006.01)
*B60B 7/06* (2006.01)

(52) U.S. Cl.
CPC ... *B60B 7/12* (2013.01); *B60B 7/08* (2013.01); *B60B 7/063* (2013.01); *B60B 2900/112* (2013.01); *B60B 2900/115* (2013.01)

(58) Field of Classification Search
CPC .............. B60B 7/12; B60B 7/08; B60B 7/063
See application file for complete search history.

(56) References Cited

U.S. PATENT DOCUMENTS

| | | | | |
|---|---|---|---|---|
| 4,917,441 A * | 4/1990 | Iida | ............................. | 301/37.36 |
| 5,718,484 A * | 2/1998 | Sheu | ........................... | 301/37.33 |
| 5,752,745 A * | 5/1998 | Sheu | ........................... | 301/37.32 |
| 6,682,150 B1 * | 1/2004 | Chen | ........................... | 301/37.33 |
| 6,726,290 B1 * | 4/2004 | Yue | ............................. | 301/37.23 |
| 7,488,045 B1 * | 2/2009 | Wang | ........................... | 301/37.33 |
| 2004/0145234 A1 * | 7/2004 | Wang | ........................... | 301/37.33 |
| 2004/0195906 A1 * | 10/2004 | Huang Tsai | ................. | 301/37.33 |
| 2006/0145529 A1 * | 7/2006 | Wang | ........................ | 301/37.104 |
| 2013/0241268 A1 * | 9/2013 | Wang | ........................ | 301/37.102 |

FOREIGN PATENT DOCUMENTS

TW M394921 U1 12/2010

* cited by examiner

*Primary Examiner* — Kip T Kotter
(74) *Attorney, Agent, or Firm* — Rosenberg, Klein & Lee

(57) ABSTRACT

A fitting structure of wheel covers is provided with a plurality of holes disposed circularly around a wheel cover. An inner edge of each hole is projected to form a positioning seat. A fixing seat is connected to a bottom edge of the positioning seat by a connecting segment. In a first position, a fixing seat is located adjacent each hole. The positioning seat includes two mounting rods at two sides respectively, a hook arranged at a center, and mounting space formed between the mounting rod and the hook. The fixing seat includes mounting blocks corresponding to the mounting space and mounted with the mounting rods, and in a second position, the stopping bars lean against the corresponding mounting rods.

4 Claims, 8 Drawing Sheets

FITTING STRUCTURE OF WHEEL COVER

BACKGROUND OF THE INVENTION

1. Fields of the Invention

The present invention relates to a fitting structure of wheel covers, especially to a fitting structure of wheel covers that is easily assembled and is integrated into one piece for preventing component loss problem during the assembly process. Moreover, both structural stability and strength are enhanced.

2. Descriptions of Related Art

Cars are the most common transportation vehicles in daily lives. The transportation time is reduced by driving cars. Cars also provide shielding during days with bad weather. For running smoothly on the road, a plurality of wheels disposed on a bottom of cars is the most important. In order to modify the appearance of the wheel, a wheel cover is mounted on a rim of the wheel. Moreover, some patterns or figures are arranged at an outer surface of the wheel cover so as to cover and improve and appearance of the wheel cover. Thus the car looks more beautiful and valuable.

As revealed in Taiwanese patent publication No. M394921 published on Dec. 21, 2010 "vehicle wheel cover", a general wheel cover includes a disc surface, a plurality of fitting members and a circular steel wheel. A plurality of fitting bases is arranged at intervals close to a circumference of a rear side of the disc surface. Each fitting member is assembled with the fitting base correspondingly while the steel wheel is mounted on an inner side of the fitting members. A main body of the fitting base includes two fitting slots located on the left side and the right side symmetrically. A support piece slanting downward is disposed on a center and two sides of an outer surface of the main body so as to form two slides. A mounting slot with an opening facing upward is arranged at a center of an inner surface of the main body while a support rod is set on each of two sides of the inner surface. Two symmetrical hooks are respectively formed on the left side and right side of the bottom of an outer surface of the fitting member while a mounting plate is extended downward from a center of the bottom of an inner surface. A gap between a main body of the hook and the mounting plate is for receiving and mounting the main body of the fitting base. The gap between the main body of the hook and the mounting plate is aligned with the main body of the fitting base and then the fitting member is pressed downward so that a hook part of the hook of the fitting member slides downward along each slide to lock with the fitting slot firmly. At the same time, the mounting plate of the fitting member is positioned against the mounting slot to be clamped and positioned. The two bottoms of the mounting plate are supported by the two support rods. Next the steel wheel is mounted into the inner side of the fitting member.

Although the steel wheel of vehicles can be fitted and connected by the structure mentioned above, the fitting base set on the disc surface, the fitting member and the steel wheel mounted in the inner side of the fitting member make the structure too complicated. Thus the manufacturing processes become complicated and the cost is high. Moreover, the fitting member and the fitting base on the disc surface are separated. The loss of the fitting member may cause problems in assembly.

Thus there is room for improvement and a need to provide an improved fitting structure of wheel covers that overcomes shortcomings of the structure of the wheel cover available now mentioned above so as to have higher practical value.

SUMMARY OF THE INVENTION

Therefore it is a primary object of the present invention to provide a fitting structure of wheel covers that improves the shortcomings mentioned above by integrating a fitting member with a wheel cover into one piece. Thus there is no component loss problem occurred during the assembly process. At the same time, the assembly is easier and the structural stability and strength are improved.

In order to achieve the above object, a fitting structure of wheel covers of the present invention includes a plurality of plurality of holes disposed circularly around a wheel cover. An inner edge of each hole is projected to form a positioning seat. A fixing seat is located adjacent the hole and is connected to a bottom edge of the positioning seat by a connecting segment. The positioning seat consists of two mounting rods at two sides respectively, a hook arranged at a center, and mounting space formed between the mounting rod and the hook. The fixing seat includes mounting blocks corresponding to the mounting space and mounted with the mounting rods, and stopping bars against the mounting rods correspondingly. With the above components integrated into one piece, the assembly of the wheel cover is easy, the positioning is stable and the structural strength and stability of the wheel cover are increased.

A connecting bar is arranged between the two mounting blocks and is locked with and positioned by the hook correspondingly while the hook is a bit projecting from an end surface of the fixing seat.

A curved guiding part is formed on the position of the mounting block that corresponds to the mounting rod so that the mounting block is moved and fitted more easily and smoothly.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
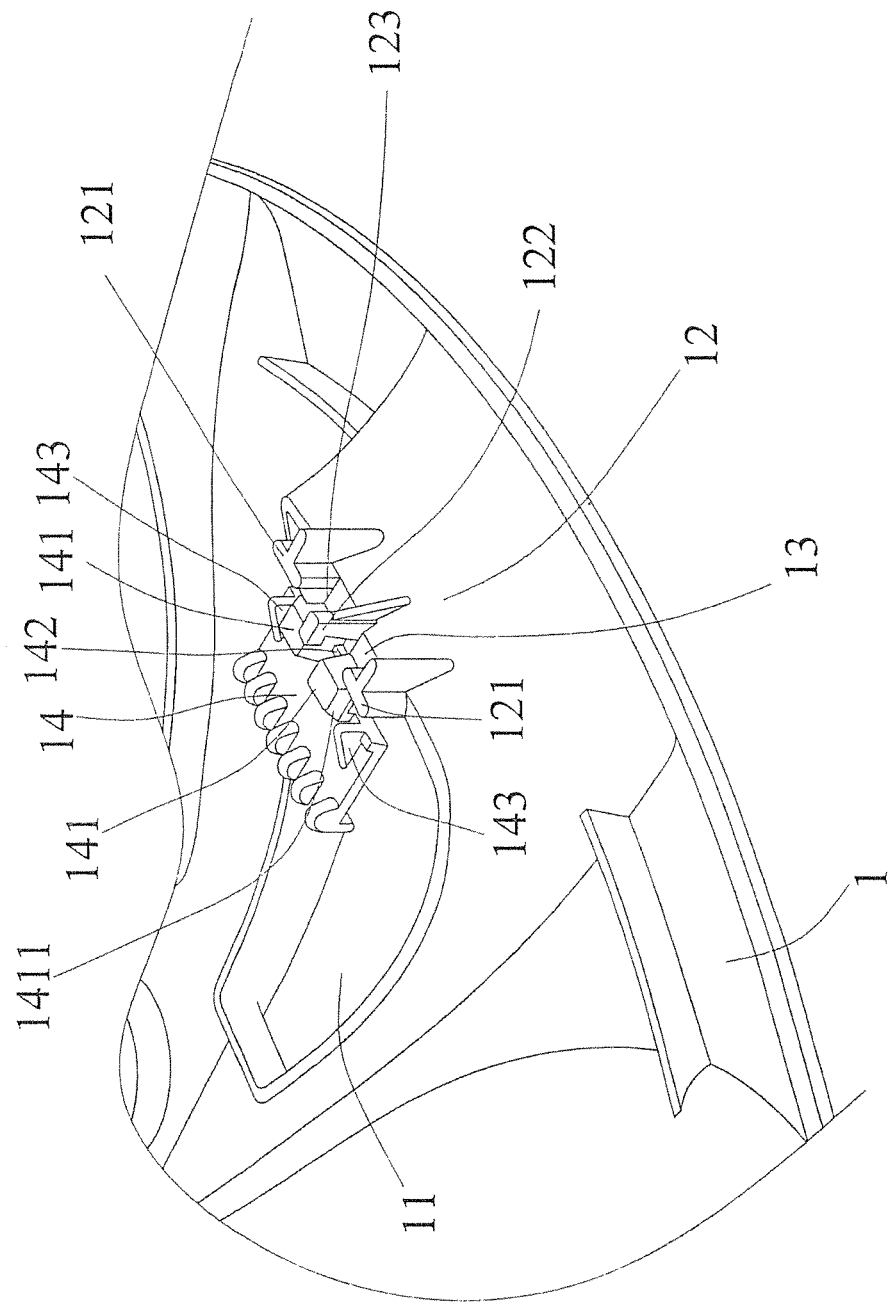
FIG. 1 is a perspective view of an embodiment before being assembled according to the present invention.
Figure 2:
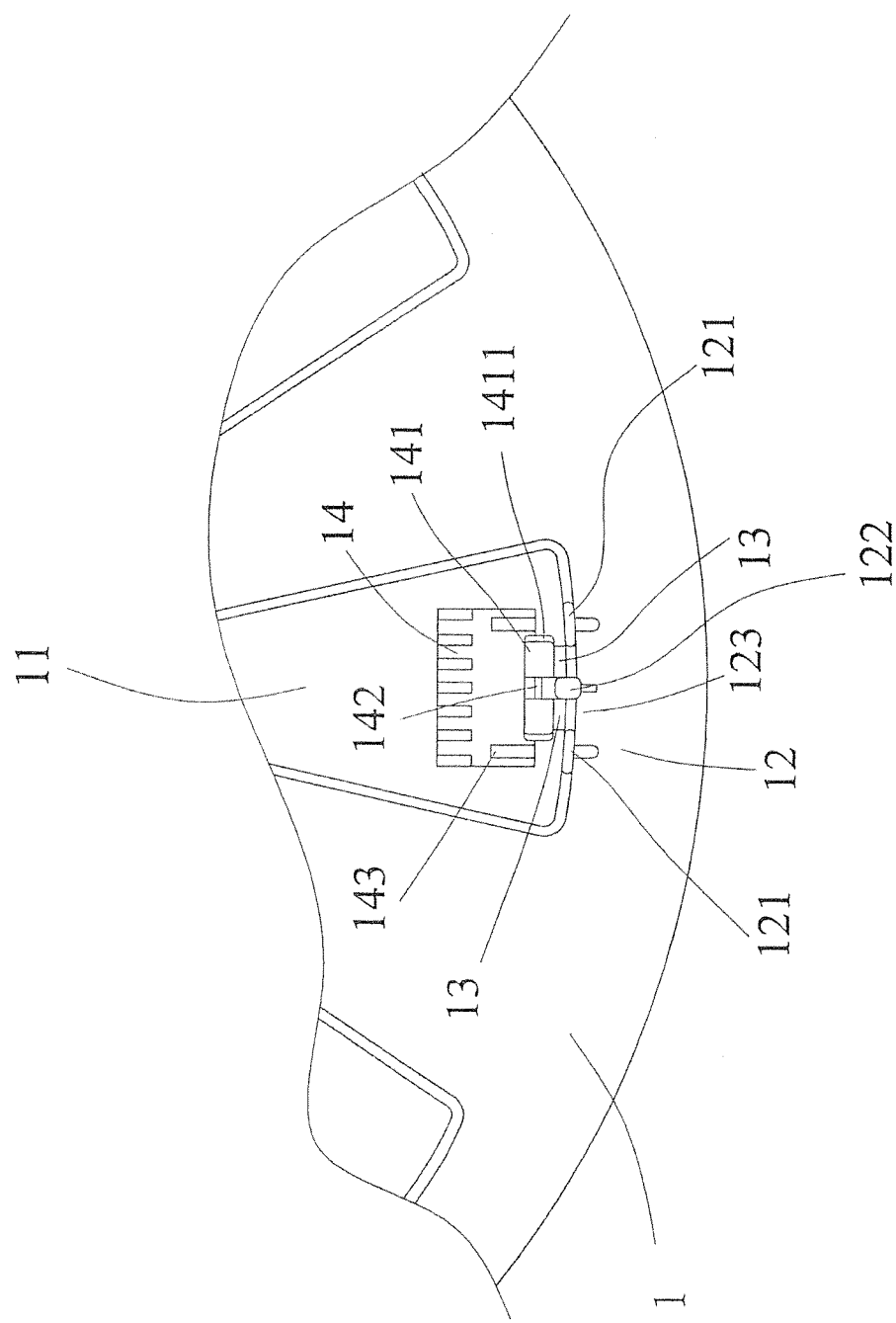
FIG. 2 is a top view of an embodiment before being assembled according to the present invention.
Figure 3:
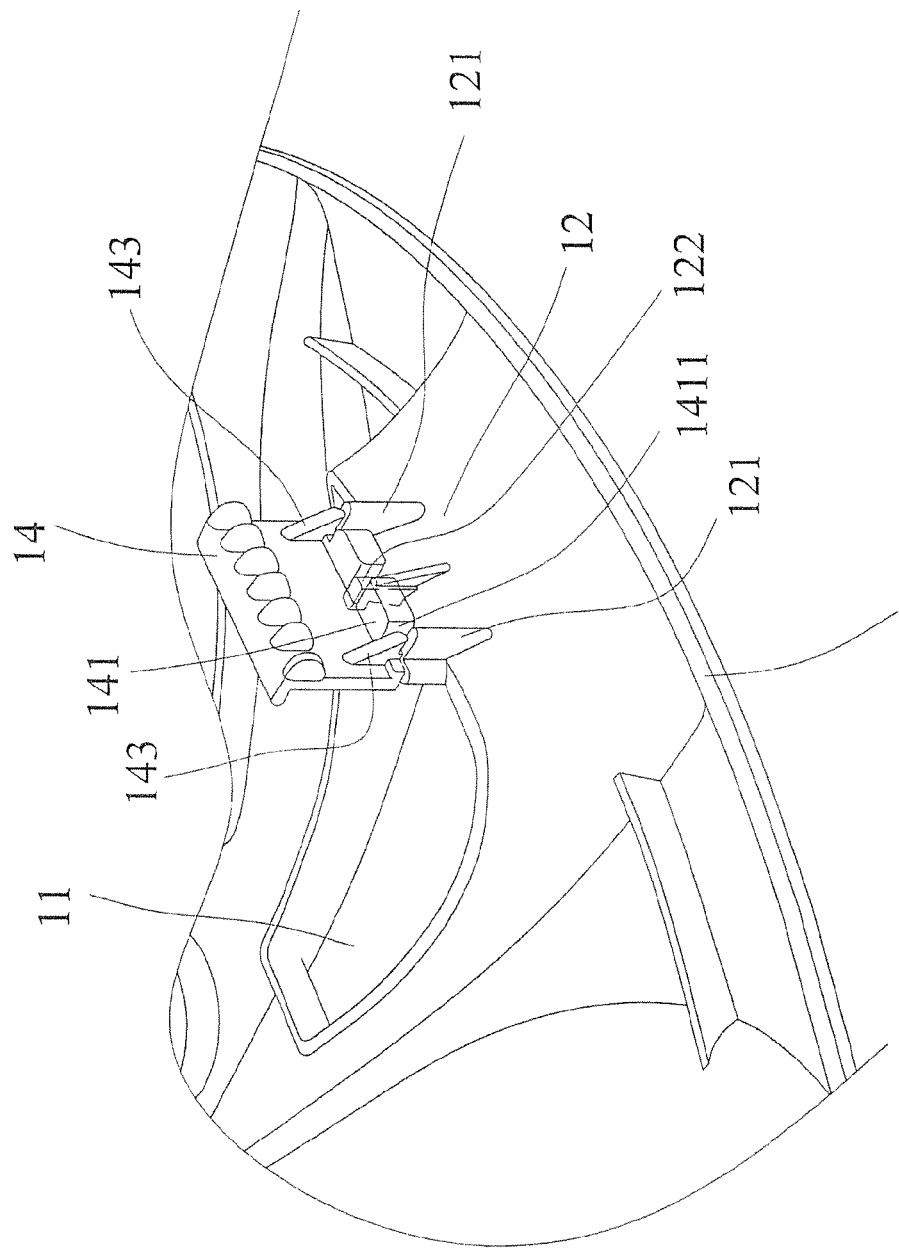
FIG. 3 is a perspective view of an embodiment after being assembled according to the present invention.
Figure 4:
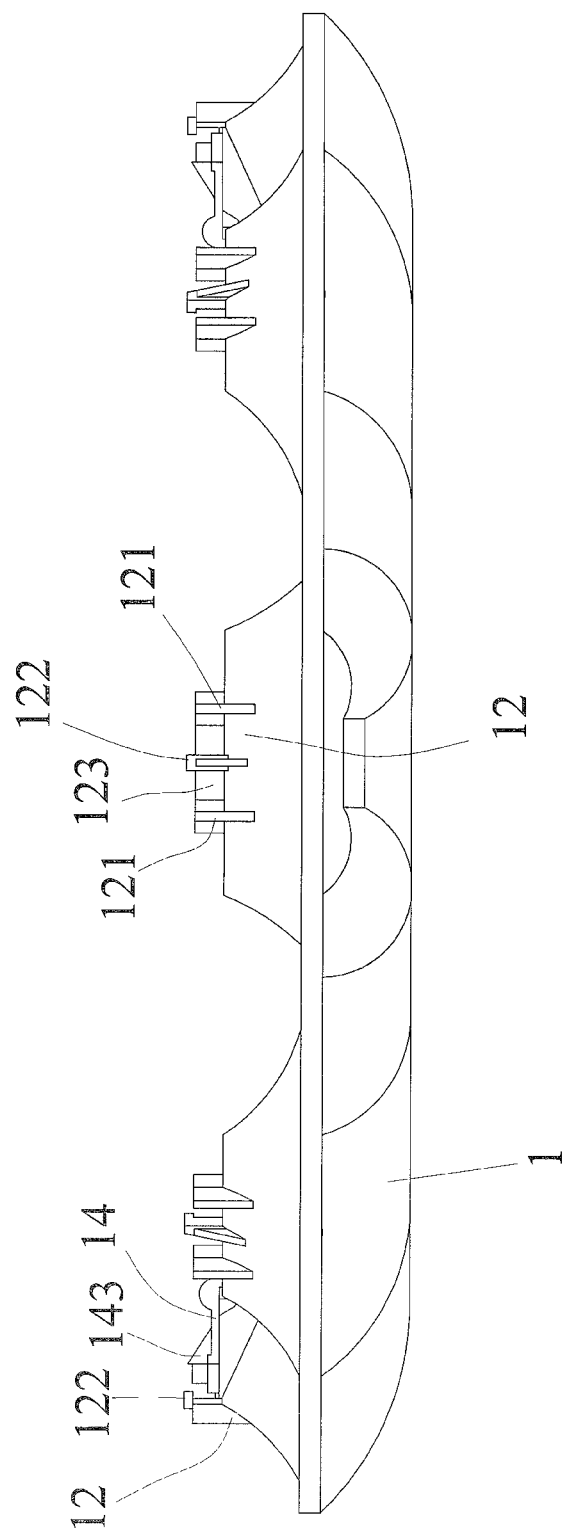
FIG. 4 is a side view of an embodiment before being assembled according to the present invention.

Referring to FIG. 1, FIG. 2 and FIG. 3, a plurality of holes 11 is arranged circularly around a wheel cover 1. An inner edge of each hole 11 is projected to form a positioning seat 12 correspondingly. A fixing seat 14 is located adjacent the hole 11 and is connected to a bottom edge of the positioning seat 12 by a connecting segment 13.

The positioning seat 12 includes two mounting rods 121 arranged at two sides thereof respectively, a hook 122 disposed between the two mounting rods 121, and mounting space 123 formed between each mounting rod 121 and the hook 122. The connecting segment 13 is extended from the mounting space 123 and is connected to the fixing seat 14 correspondingly. Corresponding to the mounting space 123, the fixing seat 14 is disposed with mounting blocks 141 that is mounted with and positioned by the mounting rods 121. A connecting bar 142 is arranged between the two mounting blocks 141. The connecting bar 142 is locked with and positioned by the hook 122 correspondingly. The fixing seat 14 is further set with stopping bars 143 corresponding to and against the mounting rods 121 of the positioning seat 12 respectively.

Figure 5:
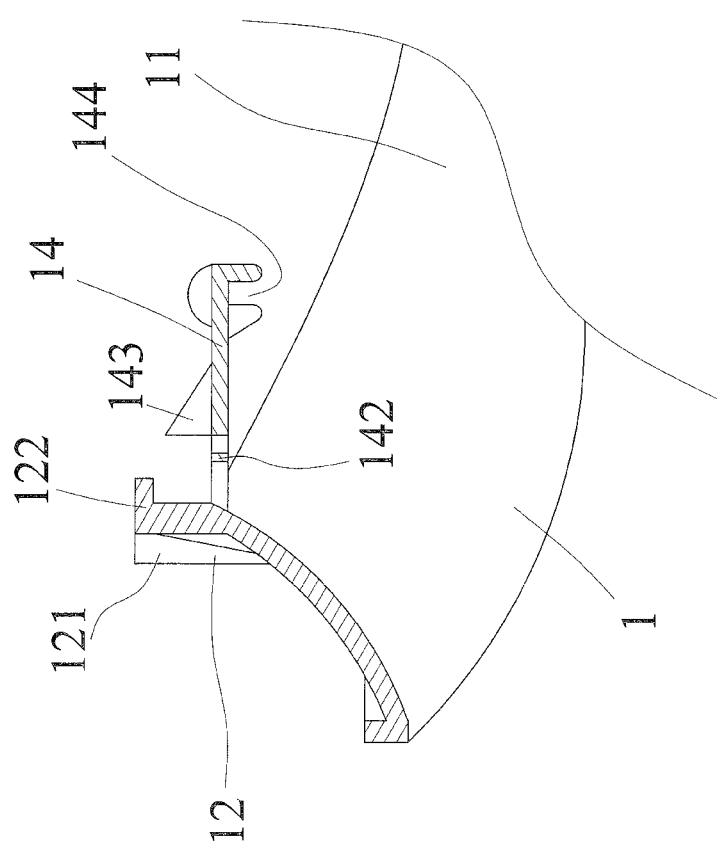
FIG. 5 is a schematic drawing showing a cross section of an embodiment before being assembled according to the present invention.
Figure 6:
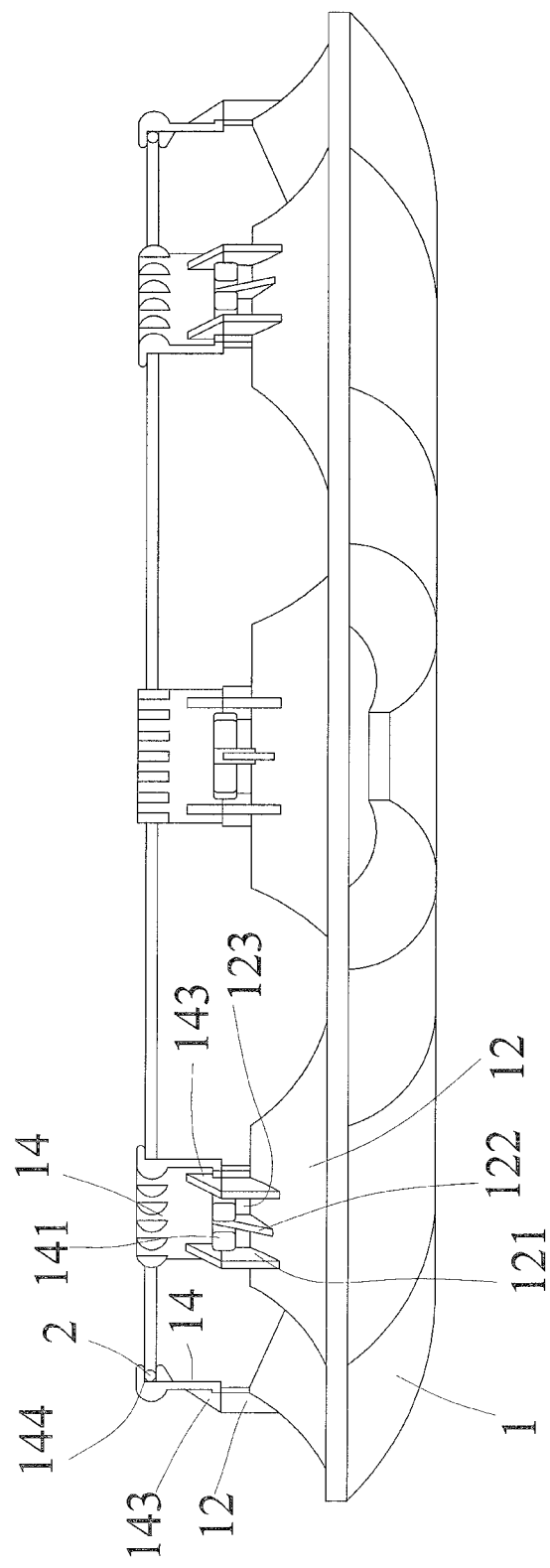
FIG. 6 is a side view of an embodiment after being assembled according to the present invention.
Figure 7:
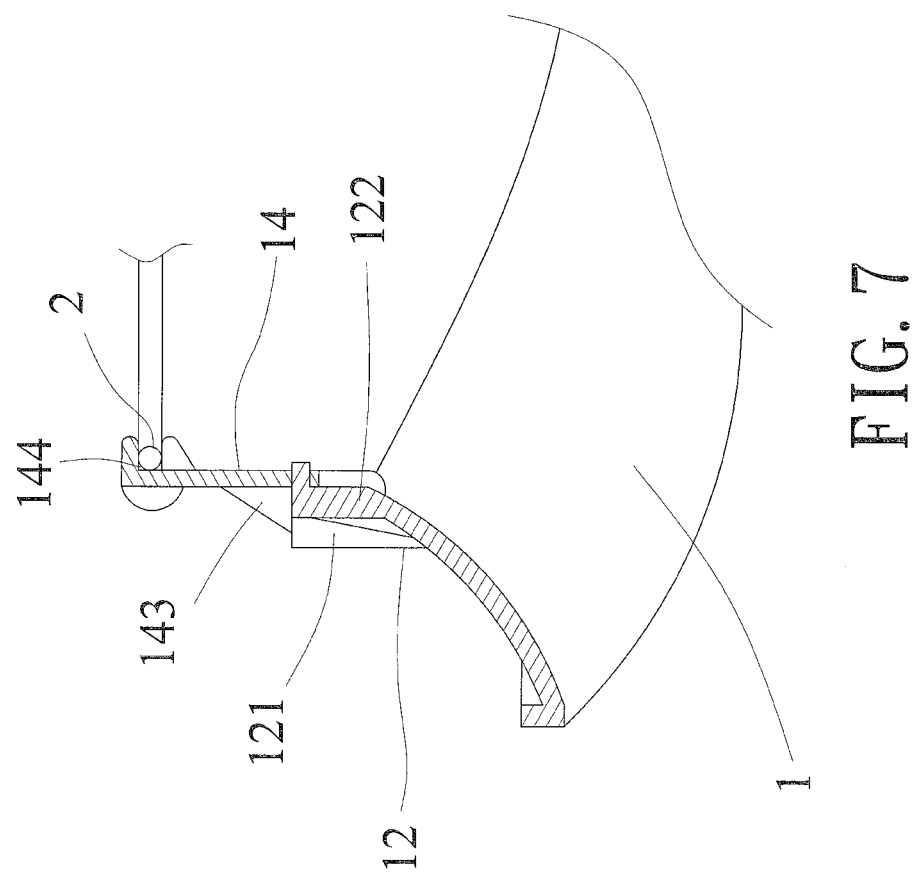
FIG. 7 is a schematic drawing showing a cross section of an embodiment after being assembled according to the present invention.

Referring to FIG. 5 and FIG. 7, after the wheel cover 1 of the present invention being formed, the fixing seat 14 that is connected to the positioning seat 12 by the connecting segment 13 is located adjacent the hole 11 and arranged horizontally. While in assembly and use, the fixing seat 14 is pushed toward the positioning seat 12 by using the connecting segment 13 as an axis. Thus the two mounting blocks 141 of the fixing seat 14 are moved into the mounting space 123 of the positioning seat 12, pressed against and fitted with the mounting rods 121 correspondingly. A curved guiding part 1411 is formed on the position of the mounting block 141 that corresponds to the mounting rod 121 so as to make the movement and fitting of the mounting block 141 become more smoothly. At the same time, the hook 122 is locked with the connecting bar 142 between the two mounting blocks 141 to be positioned. After being positioned, the hook 122 is projects a bit from an end surface of the fixing seat 14 so as to achieve precise positioning As shown in FIG. 6 and FIG. 7, while the fixing seat 14 being assembled vertically, a metal ring 2 is mounted and secured in a fixing groove 144 on an inner end surface of the fixing seat 14 by the stopping bars 143 of the fixing seat 14 and the mounting rods 121 of the positioning seat 12 leaning against each other. Thus the wheel cover 1 is fitted and fixed on the vehicle wheel and the wheel cover 1 has structural strength and stability.

Figure 8:
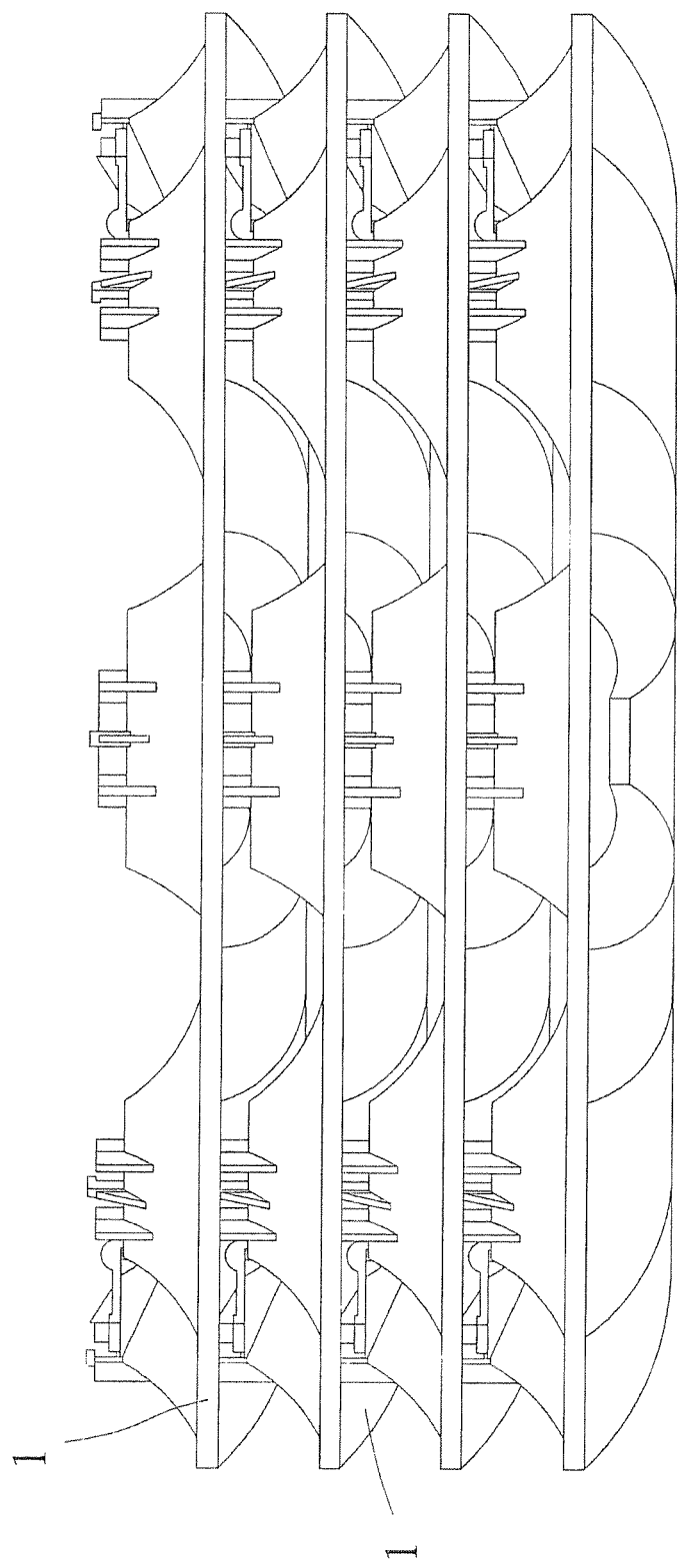
FIG. 8 is a schematic drawing showing a plurality of wheel covers stacked together according to the present invention.

When the present invention has been produced and shipped out of the factory, please refer to FIG. 8, the fixing seat 14 of the wheel cover 1 is arranged horizontally adjacent the hole 11 so as to decrease the height of the wheel cover 1 and the space the stacked wheel covers 1 occupies is reduced. Thus the cost of packaging, storage, and transportation is significantly reduced.

Compared with the structure available now, the present invention has following advantages in manufacturing:

1. The fitting member and the wheel cover are integrated into one piece. Thus there is no component loss problem occurred during the assembly process. And the assembly process of the wheel cover is easier and more convenient.

2. The structural stability and strength are improved by the mounting blocks fitted with the mounting rods and the mounting rods pressed against the stopping bars.

3. Precise positioning is achieved by the hook being locked with the connecting bar between the two mounting blocks to be positioned and the hook projecting a bit from an end surface of the fixing seat after being positioned.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fitting structure of wheel covers comprising:
   a plurality of holes disposed circularly around a wheel cover;
   a positioning seat projected from an inner edge of a respective hole of the plurality of holes; and
   a fixing seat that is located adjacent to the respective hole and is connected to a bottom edge of the positioning seat by a pair of connecting segments;
   wherein two mounting rods are arranged at two sides of the positioning seat respectively and a hook is disposed between the two mounting rods while a mounting space is formed between each of the mounting rods and the hook; each connecting segment is extended from each mounting space and is connected to the fixing seat correspondingly; the fixing seat is disposed with mounting blocks that correspond to each mounting space and each of the mounting blocks are mounted adjacent to stopping bars; a connecting bar is arranged between the two mounting blocks and is locked with and positioned by the hook correspondingly; the fixing seat is further set when the fixing seat with the stopping bars is rotated with the stopping bars positioned to lean against the corresponding mounting rods of the positioning seat.

2. The device as claimed in claim 1, wherein a curved guiding part is formed on a position of the mounting block that corresponds to the mounting rod.

3. The device as claimed in claim 2, wherein the hook is locked with and positioned by the connecting bar between the two mounting blocks correspondingly; the hook is a bit projecting from an end surface of the fixing seat after being positioned.

4. The device as claimed in claim 1, wherein the hook is locked with and positioned by the connecting bar between the two mounting blocks correspondingly; the hook is a bit projecting from an end surface of the fixing seat after being positioned.

* * * * *